Patented Dec. 16, 1930

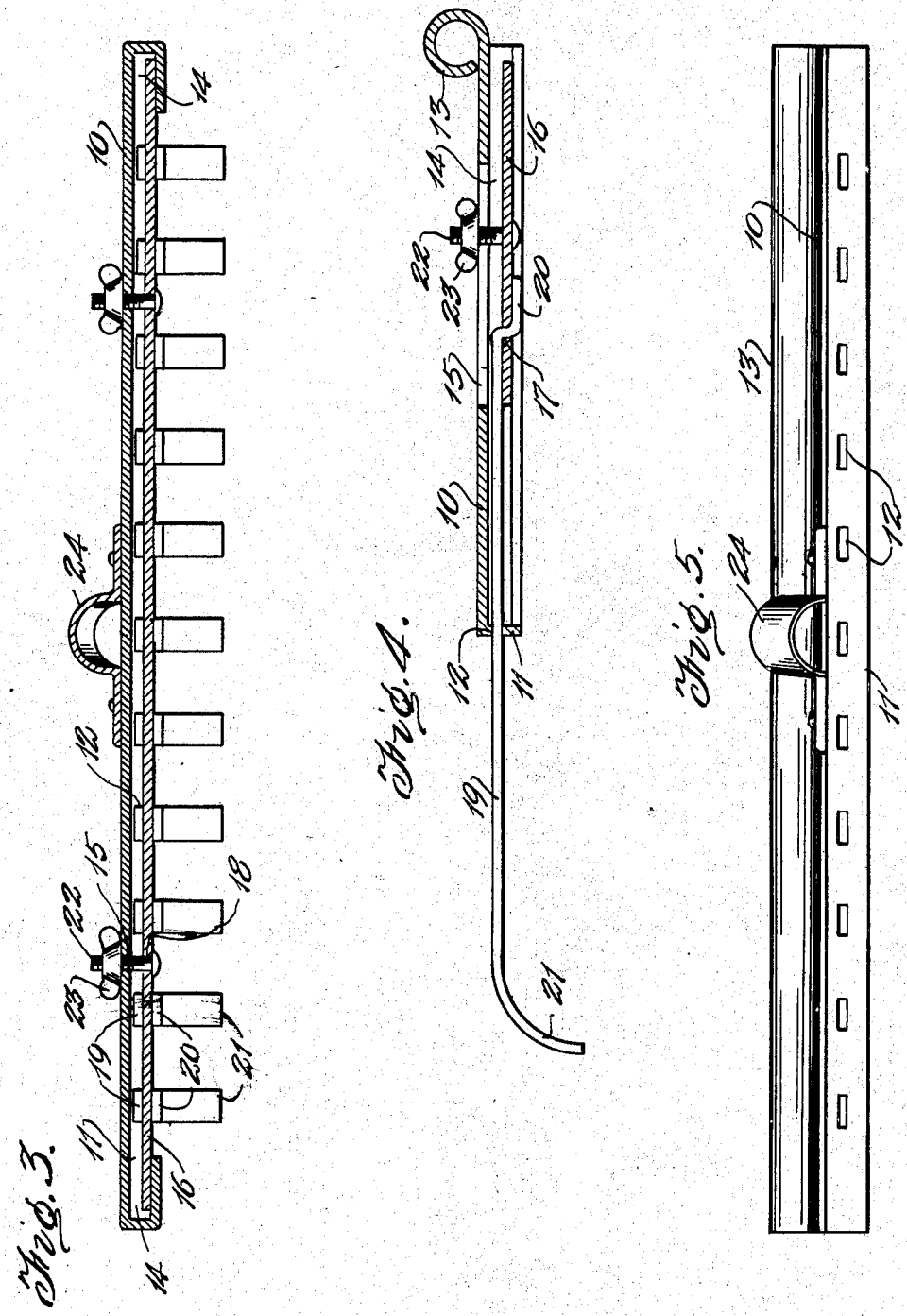

1,785,320

UNITED STATES PATENT OFFICE

CHARLES LORBER, OF LOUISVILLE, KENTUCKY, ASSIGNOR TO EASTERN TOOL AND MANUFACTURING COMPANY, OF BLOOMFIELD, NEW JERSEY, A CORPORATION OF NEW JERSEY

LAWN RAKE

Application filed June 19, 1929. Serial No. 372,149.

This invention relates to rakes and has special reference to a spring toothed lawn rake.

The ordinary spring toothed lawn rake is suitable but for one purpose, that purpose depending on the length and yieldability of the resilient teeth. For instance, for lawns or flower beds only light raking is desirable so that very flexible teeth have to be provided to avoid injuring the young growing grass or flowers or the roots. Medium raking is used on a dirt lawn or raking the fallen leaves in the fall and somewhat stiffer teeth are desirable for this purpose. For use on a road or a gravel bed that contains much gravel stiff teeth are advisable so that the teeth will not pass over the particles of gravel or spread to let them through. This usually requires three different rakes.

The principal object of the present invention is to provide an improved form of rake having resilient teeth the active length of which may be adjusted so that these teeth may be varied from freely flexible teeth to stiff teeth. In other words, so that the effective flexibility of the teeth may be varied.

A second important object of the invention is to provide an improved rake of this description capable of being manufactured in an economical manner and consisting of but few parts and those of such nature as to be easily manipulated in adjusting the rake and not to be readily broken or otherwise injured.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 3 is a detail section taken transversely through the rake on the line 3—3 of Figure 2.

Figure 4 is a section taken longitudinally through the rake on the line 4—4 of Figure 1.

Figure 5 is a detail view in front elevation of the rake head with the remainder of the parts removed.

Figure 1:
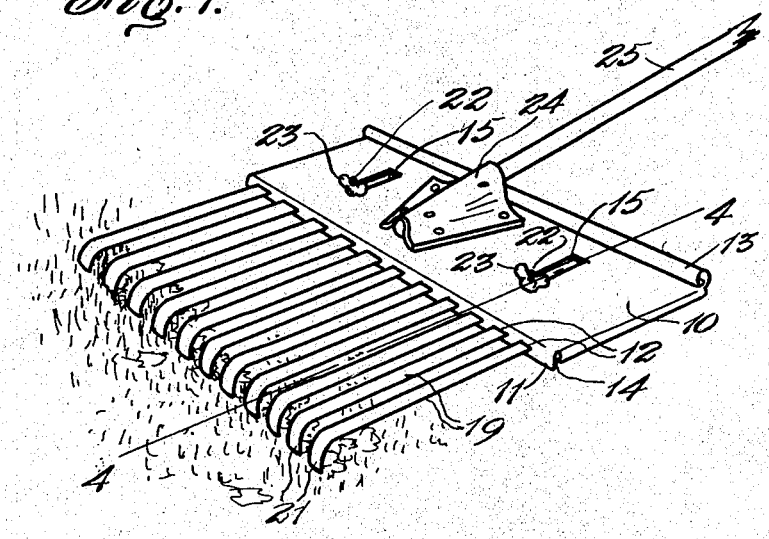
Figure 1 is a perspective view of the improved rake with the teeth fully extended and in their most flexible arrangement.
Figure 2:
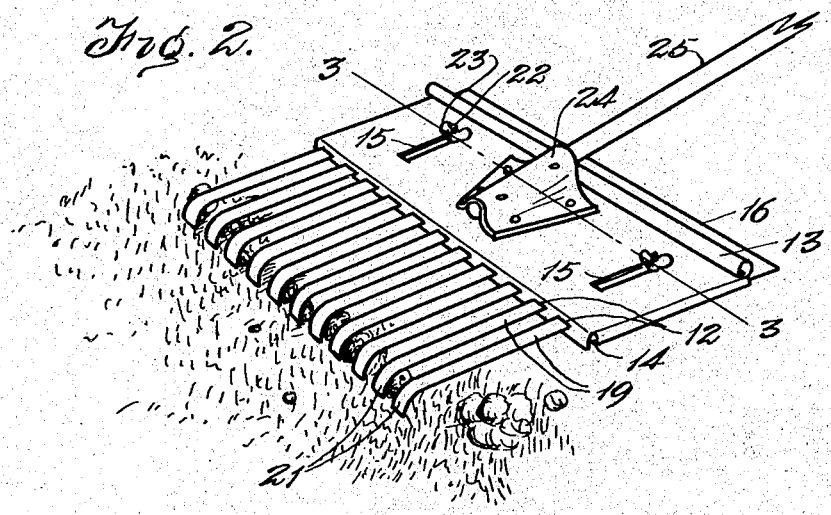
Figure 2 is a perspective view of the rake with the teeth fully retracted.

In the construction of the rake as shown in the present embodiment the rake head is provided with a body preferably formed of sheet metal and consisting of a flat plate 10 having a depending flange formed at its forward end as at 11 and this flange is provided with laterally spaced and laterally elongated slots 12 which may be termed tooth slots. The rear edge of the plate 10 is curled upwardly to form a stiffening bead 13 and each lateral edge is bent downwardly and then inwardly so that these edges form opposed guide channels 14. Also, the body 10 is provided with a pair of longitudinally extending slots 15 parallel to the side edges. Slidably mounted in the guide channels 14 is a tooth plate 16 having near its forward edge a series of laterally spaced and laterally elongated slots 17. Also this plate is provided with bolt openings 18 spaced from the sides so as to lie beneath the openings 15. Each of the teeth of this rake is formed from a single flat spring strip of material having a main portion 19 which extends through a respective slot 12 and at the rear end of this main portion is an offset base portion 20 so that the tooth base may be inserted through one of the slots 17 and have the portion 20 lie beneath the plate 16 while the rear end of the portion 19 lies on top of said plate. By this means the teeth, while held securely to move in unison with the plate, and, of course, with each other, may yet be readily removed for repairs or replacement, without the necessity of using any tools. Obviously, if it be so desired, the teeth may be permanently attached to the plate 16. The forward ends of these strips are bent down as at 21 to form ground engaging portions. Projecting upwardly through the openings 18 and slots 15 are bolts 22 and on each of these bolts is a wing nut 23. By this means the plate 16 may be clamped in desired adjusted position relative to the plate or body 10 and thus the rake teeth be secured in protracted position as in Figure 1, in retracted position as in Figure 2 or in any position between these two. Obviously, the effective flexibility of the teeth as rake teeth will be at its maximum in the protracted position, at its minimum in retracted position and may be varied in accordance with the position of the plate 16 between such maximum and minimum flexibility. A handle socket 24 and handle 25 are provided as is usual in all such devices.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a rake, a body consisting of a metal sheet having a flange at its forward edge provided with spaced openings, rake teeth slidably mounted for adjustment in said openings, means slidably supported by said body beneath the same to secure said teeth in fixed position relative to each other to cause the teeth to move in unison in said openings, and means to secure said teeth in adjusted position.

2. In a rake, a body consisting of a single plate of sheet metal, a depending flange at the forward edge of said body and having spaced tooth openings, a tooth plate mounted beneath said body to move forwardly and backwardly relative thereto and slidably connected to the body, teeth carried by said plate and projecting forwardly through the openings in the flange, and means for securing the plate in adjusted position relative to the body.

3. In a rake, a body, a depending flange at the forward edge of said body and having spaced tooth openings, a tooth plate mounted beneath said body to move forwardly and backwardly relative thereto, teeth carried by said plate and projecting forwardly through the openings in the flange, said body having spaced longitudinally extending slots, bolts carried by the plate and extending upwardly through said slots, and nuts on said bolts to bind the plate and body together in adjusted positions.

4. In a rake, a body consisting of a flat plate having a depending flange at its forward edge provided with laterally elongated spaced tooth openings, said body having its lateral edges extending downwardly and inwardly to form guide channels, said body having elongated slots parallel to said lateral edges and spaced inwardly therefrom, a tooth plate having lateral edges engaged in said channels to permit the plate to slide forwardly and backwardly beneath said body, said plate having bolts extending upwardly through said slots, nuts on said bolts engaging the upper face of the body, and flat strips of spring material having their base portions fixed to said plate adjacent its forward edge and projecting forwardly from the plate through said openings and having their forward ends turned downwardly to form rake teeth.

In testimony whereof I affix my signature.

CHARLES LORBER.